May 27, 1969          R. E. BRASIER          3,446,560
THREE DIRECTIONAL OPTICAL ALIGNMENT INSTRUMENT
Filed March 8, 1965
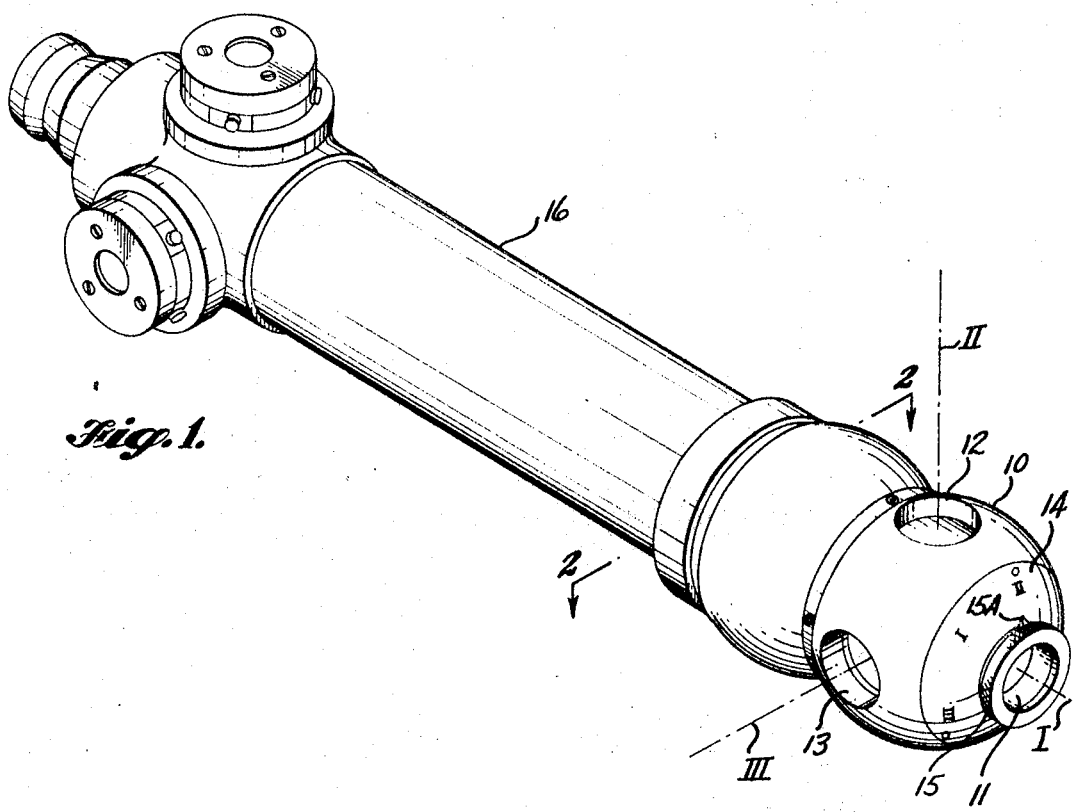
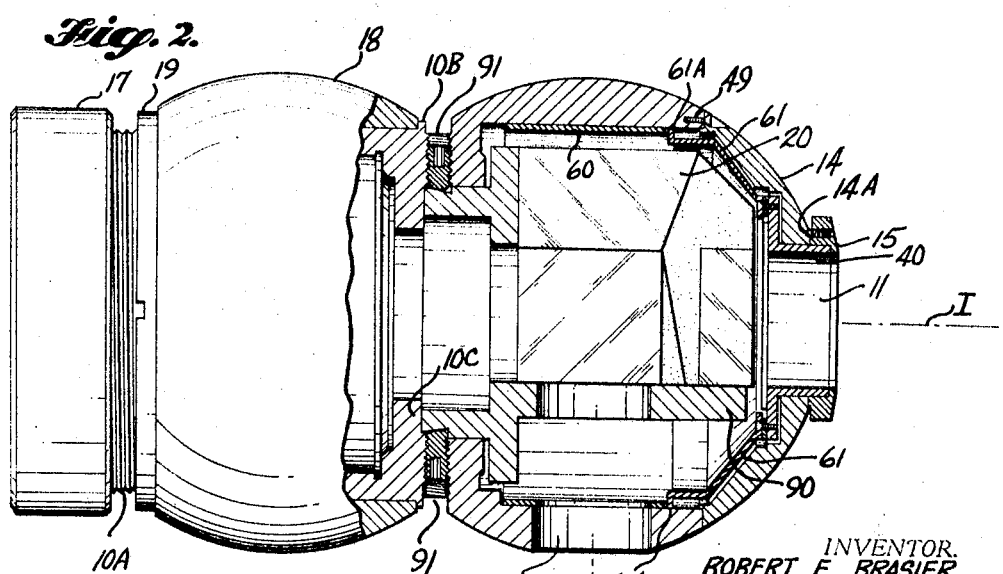
INVENTOR.
ROBERT E. BRASIER
BY Orland M. Christensen
ATTORNEY May 27, 1969

R. E. BRASIER 3,446,560

THREE DIRECTIONAL OPTICAL ALIGNMENT INSTRUMENT

Filed March 8, 1965

INVENTOR.
ROBERT E. BRASIER
BY Orland N. Christensen
ATTORNEY

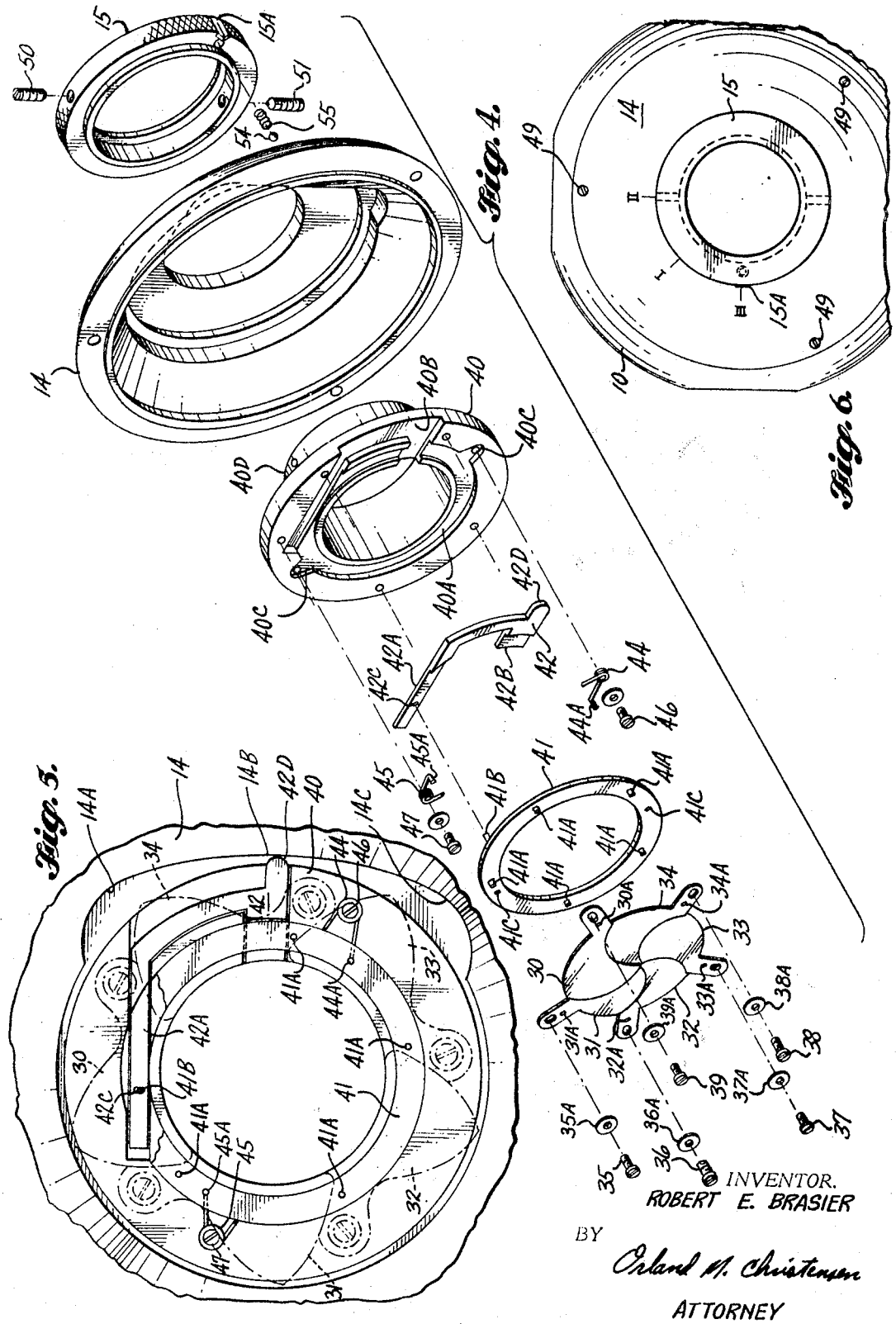

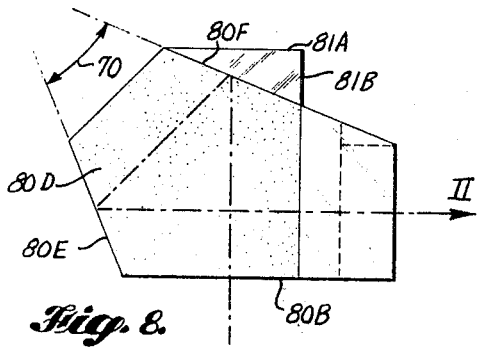
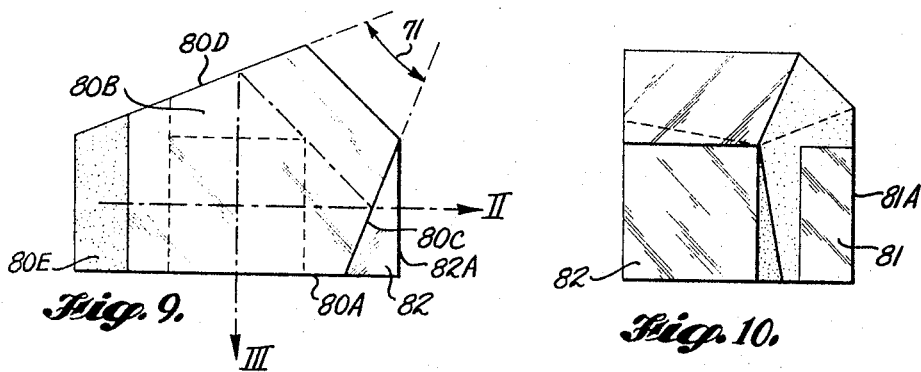
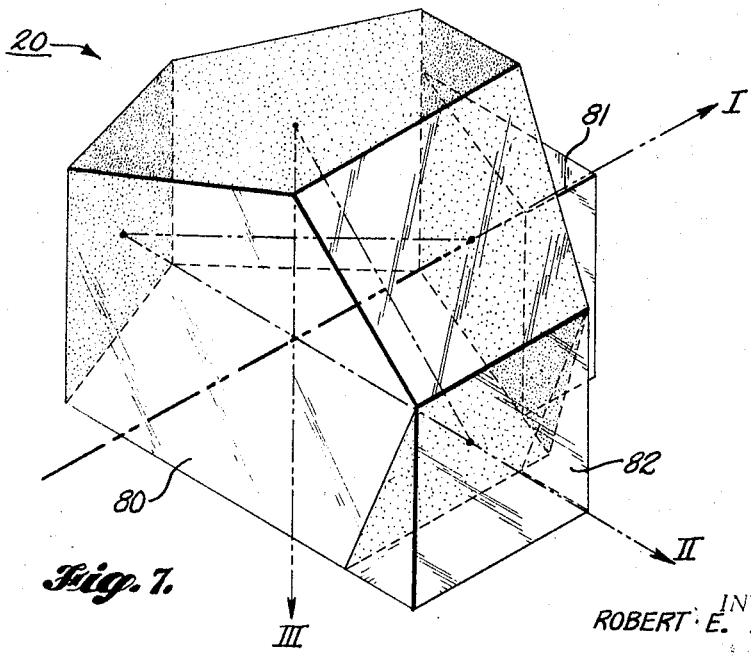

United States Patent Office 3,446,560
Patented May 27, 1969

3,446,560
THREE DIRECTIONAL OPTICAL ALIGNMENT INSTRUMENT
Robert E. Brasier, Seattle, Wash., assignor to The Boeing Company, Seattle, Wash., a corporation of Delaware
Filed Mar. 8, 1965, Ser. No. 437,705
Int. Cl. G01c *1/00, 15/00*
U.S. Cl. 356—146                                                   17 Claims

ABSTRACT OF THE DISCLOSURE

A three directional optical alignment instrument is disclosed which includes optical means capable of receiving light along any of three separate light paths without changing its position, and directing the light thus received along a common light path, with light control means such as shutters for obstructing the reception of light along any of the three paths. The three separate light paths intersect at a common point and each pair thereof forms a different plane from each of the other pairs thereof. In preferred forms of the instrument the separate light paths are orthogonal, established by a single optical prism element, and the light control means includes a combination of particular improvements in shutter assemblies.

The present invention relates to optical instruments adapted for use in optical tooling and more particularly to an improved optical instrument which includes an improved optical element and supporting apparatus for simultaneously locating three mutually perpendicular axes.

Various types of optical devices have been devised and utilized for locating components in correct relationship to one another through the use of accurately established permanent reference points. It is common practice to locate three intersecting mutually perpendicular axes during the construction of large structures and assemblies such as aircraft, buildings, and others wherein extreme accuracy of the major axes must be maintained.

One of the most commonly utilized optical instruments for locating reference points along the referred to fixed axes is an optical square having the capability of locating two mutually perpendicular axes. In instruments of this type a conventional pentaprism is often used since such a prism has the characteristic that light received perpendicular to one of the faces of the pentaprism is reflected internally by the prism and so that it exits from the prism perpendicular to a second face which is at 90° with respect to the entrance surface. The light from the pentaprism is focused by a conventional telescope aligned with the exit plane so that an observer looking into the telescope can observe objects at 90° with respect to the telescope axis. In one type of optical apparatus an optical correction wedge is secured to the pentaprism in line with the telescope axis so that the user can also look in a straight line through the pentaprism and thus establish two mutually perpendicular axes. In order to locate the third axis the entire prism assembly is then rotated, which generally necessitates realignment of the "straight through" axis. Thus a plane substantially perpendicular to the telescope line of sight can be generated. In practice it is found that such rotation of the pentaprism tends to disrupt the previous alignment and hence reduce overall system accuracy. Thus it would be advantageous to have an instrument capable of locating three mutually perpendicular axes without the need for rotation of the optical instrument and associated readjustment of the system to overcome disruption of previous alignments.

It is therefore an object of the present invention to provide an improved optical device for locating three mutually perpendicular axes.

It is another object of the present invention to provide an improved optical instrument for simultaneously locating three mutually perpendicular axes without the necessity for rotation of the instrument.

It is another object of the present invention to provide a novel three-directional optical square having the capability of receiving light from three mutually perpendicular directions and for then directing said light from the three mutually perpendicular directions along a common axis which is preferably parallel to one of the said three directions.

A further object of the present invention is to provide an improved optical alignment instrument including an improved three-directional optical square and mounting means therefor adapted to facilitate the accurate location of three mutually perpendicular planes.

Another object of the present invention is to provide an improved housing for an optical square.

Another object of the present invention is to provide an improved optical square housing having three entrance openings for receiving light from three mutually perpendicular axes and including improved shutter means selectively controlling the closing of two openings and opening of the third.

Another object of the present invention is to provide an improved optical instrument for locating mutually perpendicular axes and including improved means for selectively blocking the receipt of light from two of the three axes while permitting the receipt and transmission of light from the third of said three axes.

A further object of the present invention is to provide an improved optical instrument-holding apparatus having improved light entrance control means confined to a compact enclosure without protruding window covers.

In accordance with the teachings of the present invention an optical piece is provided which can be referred to as a three directional optical square since it has the capability of receiving light from three mutually perpendicular axes and directing such light along a common line parallel to one of the three axes and in a direction opposite thereto. Thus an alignment telescope positioned to receive such light permits the user to rapidly locate three mutually perpendicular axes without movement of the optical instrument or rotation of the optical element.

The prism or optical element is constructed from any suitable medium such as fused silica, fused quartz, or other material known per se in the art. First and second planar surfaces which are at 90° with respect to each other are provided, with one of the surfaces being oriented for the receipt of light perpendicular thereto and referred to as the bottom plane, the second surface being referred to as the light exit plane or surface. For ease of description the various planar surfaces will be referred to as planes. Third and fourth surfaces are cut on the optical element to define third and fourth planes at 45° with respect to each other and each perpendicular to said second or viewing plane. The third plane is cut at an angle of $\theta$ with respect to the first or bottom plane. Fifth and sixth surfaces of the prism are similarly planar surfaces each at 45° with respect to the other and each of said fifth and sixth planes being perpendicular to said first or bottom plane. The fifth plane intersects the second plane at said angle $\theta$ and also intersects the fourth plane. An optical wedge adhered to the third plane is so constructed that light traveling parallel to the first and second planes will pass through the wedge and said third planar surface and remain parallel to said first and second planes upon exiting from said third plane to the interior of the prism. The arrangement is such that light passes through the wedge, the third surface of the prism, is reflected by the fifth and sixth surfaces, and exits through the second surface at an angle of 90° with respect to its original direction. In a similar manner light traveling perpendicular to the bottom or first plane of the prism will enter the prism and undergo four reflections from the fourth, third, fifth, and sixth surfaces, respectively, and exit from the prism through the second plane at an angle of 90° with respect thereto. The said fourth and fifth surfaces are made substantially totally reflective to interior light while the third surface having the optical wedge secured thereto is only partially aluminized or silvered so that light can pass therethrough from the exterior of the optical element along one of the three mutually perpendicular axes and yet light reflected from the totally reflective fourth surface of the top of the optical prism will be reflected from the interior of the third surface.

A second optical wedge is adhered to the sixth surface of the optical element (which is opposite the second surface) so that light traveling parallel to the telescope line of sight will enter the sixth surface and exit perpendicular to the second surface. Since the sixth surface also acts as a reflector to internal light and yet transmits light from the exterior, it is also only partially reflective.

The optical element described above is advantageously used in combination with the improved holder of the present invention which is adapted to selectively block the entrance of light along two of the three mutually perpendicular axes so that an observer will receive light from a single selected one of the three mutually perpendicular axes. A control arrangement in the form of a shutter system is provided so that the operator can readily select which of the three entrance openings will be unblocked and hence will permit the user to select which of the three axes is to be located. A single rotatable knob is coupled with the shutter assemblies for the three light entrance openings in a manner such that changing the setting of the knob from one of its three conditions to another serves to change the single opening then being selected. Since the optical instrument itself is not moved during the selection of each of the three mutually perpendicular axes an extremely accurate apparatus for locating mutually perpendicular axes or planes is provided. The holder for the optical element is so constructed that the shutter mechanisms do not protrude from the spherical housing which encloses the optical element. Thus the possibility of the instrument being misaligned through accident such as might be caused if protruding elements were included is substantially eliminated.

The above as well as additional advantages and objects of the present invention will be more clearly understood from the following description when read with reference to the accompanying drawings wherein:

FIGURE 1 is an isometric view of the improved optical alignment instrument of the present invention;

FIGURE 2 is a partially cut-away view of the improved optical alignment instrument of FIGURE 1, sectioned in the plane of lines I and III and viewed along line II in the direction of arrows 2—2, with an internal optical prism shown in full, to show in greater detail the location of various internal components of the apparatus;

FIGURE 4 is an exploded isometric view showing in greater detail the various parts primarily associated with the shutter assembly for the opening controlling the entrance of light along the axis indicated in FIGURE 1 as the straight-through line of sight axis I;

FIGURE 5 is an enlarged rear view showing the assembled condition of various parts illustrated in the exploded isometric view of FIGURE 4 with the shutter assembly being shown in the opened condition;

FIGURE 6 is a front view of the housing for the improved optical element of the alignment instrument showing the three positions for the control knob used to permit selective control of the various shutter assemblies;

FIGURE 7 is an enlarged isometric view of the novel optical element shown as rotated 90° from the position it would occupy in FIGURES 1 and 2;

FIGURE 8 is a reduced top view of the optical element as shown in FIGURE 7;

FIGURE 9 is a reduced front view of the optical element as shown in FIGURE 7; and FIGURE 10 is a reduced view from the right end of the optical element as shown in FIGURE 7.

Figure 3:
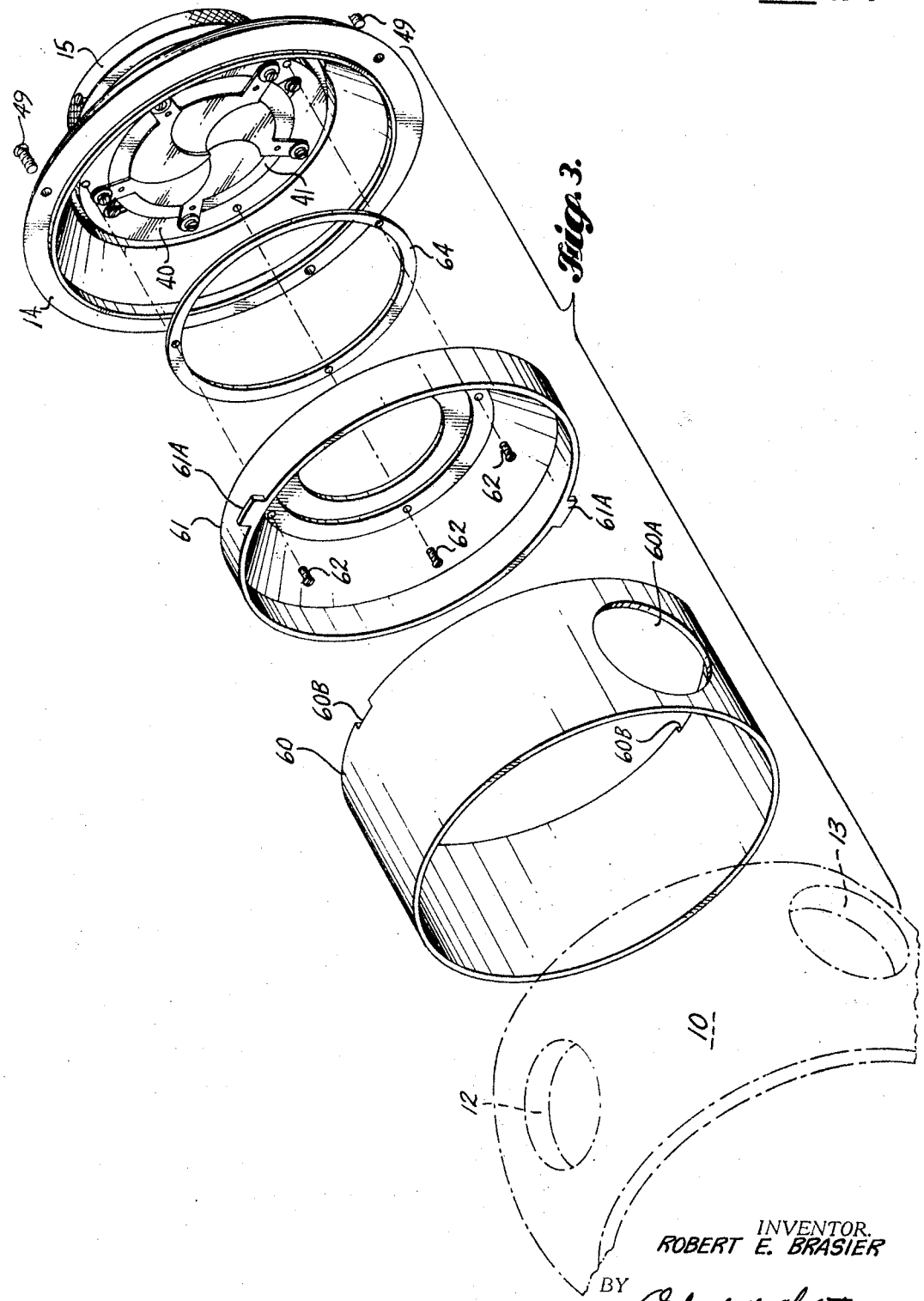
FIGURE 3 is an exploded isometric view of the shutter assembly which controls the entrance of light to the optical element.

Referring now to the drawings and in particular to FIGURES 1 and 2, the apparatus of the present invention will be seen to include a first spherical housing member 10 having three entrance openings 11, 12 and 13 so positioned that light from three mutually perpendicular directions can enter the spherical housing 10 along the three lines of sight indicated generally by the lines of sight I, II, and III. A hemispherical cap 14 is secured to and actually forms the front of the spherical housing member 10. The cap 14 not only supports a shutter adjustment knob 15 but also is part of the shutter mechanism and associated controls described in greater detail hereinafter. It will be seen most clearly in FIGURE 2 that the spherical housing 10 is provided with a threaded portion 10A to facilitate rigid attachment of an alignment telescope 16 thereto by means of a tapered sleeve clamping assembly which includes the internally threaded sleeve member 17. To facilitate support of the alignment instrument on a conventional candlestick a spherical support member 18 is provided between the telescope 16 and the spherical housing member 10. A locking nut 19 serves to hold the spherical support member 18 against the ridge 10B on the extended portion of the spherical housing member 10 as seen most clearly in FIGURE 2. The alignment telescope 16 can be any of a number well known in the art and per se forms no part of the present invention.

The spherical housing and support members 10 and 18 provide an improved housing for the optical element 20 described in greater detail hereinafter and also permit ready attachment of the apparatus to conventional support members. The geometric center of the sphere formed generally by the housing member 10 and cap 14 is the optical center for the optical element 20, the distance between the center of the sphere formed thereby and the center of the spherical support member 18 being accurately measured for each instrument to facilitate actual use thereof in locating the required spatial reference axes.

In the use of an optical alignment instrument for locating three mutually perpendicular axes the operator sequentially sights along each of three mutually perpendicular lines of sight and accurately locates the same by means of appropriate targets on which the telescope cross lines are focused. An apparatus permitting the operator to close two of the three openings 11, 12 and 13 and simultaneously open a selected one thereof with a minimum of effort and without destroying the alignment of the instrument is thus of great advantage. Such an apparatus for controlling the passage of light to the alignment telescope is provided by the present invention through the use of the shutter mechanism illustrated in detail in FIGURES 2 through 6. The shutter mechanism for the straight-through line of sight I is seen most clearly in FIGURES 3, 4 and 5 and includes five shutter leaves 30, 31, 32, 33, and 34, each supported for rotation about an associated screw 35, 36, 37, 38 and 39 passing through the substantially elliptical holes in the outer ends thereof. The screws 35–39 are threaded into the shutter support plate 40 seen most clearly in FIGURE 4. Spacing washers 35A, 36A, 37A, 38A and 39A are disposed between the respective heads of the screws 35–39 and the shutter leaves 30–34 so that the shutter leaves are free to rotate about the screws in the manner described hereinafter. A shutter control ring member 41 is provided with five studs 41A extending forwardly in FIGURE 4 and each adapted to respectively pass through an associated one of the holes 30A, 31A, 32A, 33A and 34A in the shutter leaves for controlling the position thereof. The shutter control ring 41 fits in a circular depression or groove 40A in the shutter support member 40 and is provided with a single stud 41B extending rearwardly in FIGURE 4 and passing through a shutter control plunger in the form of a slide member 42 adapted to fit in the depressed portion 40B of the shutter support member 40. The plunger or slide member 42 will be seen most clearly in FIGURE 4 to be provided with two elongated portions 42A and 42B which cooperate with the slotted or depressed portion 40B of the shutter support member 40 so that the slide member 24 can move in a substantially radial direction inwardly and outwardly with respect to the outer surface of the shutter support member 40. As seen most clearly in FIGURE 4, the stud 41B on the shutter control ring 41 passes through the hole 42C in the plunger or slide member 42 and hence when the slide member is moved radially inwardly or radially outwardly with respect to the shutter support member 40, the shutter control ring 41 will be rotated counterclockwise or clockwise as viewed in FIGURE 5 and thus the shutter leaves 30–34 will be rotated about the screws 35–39.

A pair of spring members 44 and 45 are respectively supported by bolts 46 and 47 which are threaded into associated holes in the shutter support member 40 with the spring members 44 and 45 having laterally bent-over lugs 44A and 45A which pass through the associated holes 41C in the shutter ring 41. The shutter support member 40 is provided with mating grooved-out portions 40C for holding the spring members 44 and 45, the arrangement being such that when the shutter control ring 41 and shutter leaves 30–34 are assembled on the shutter support member 40 the springs 44 and 45 serve to yieldingly hold the shutter control ring 41 in a clockwise direction as viewed in FIGURES 4 and 5. The shutter leaves 30–34 are therefore constantly urged in a counterclockwise direction about their associated supporting screws 35–39 to their respective closed positions as indicated in FIGURE 4. It will also be seen that the springs 44 and 45 serve to urge the shutter control plunger 42 radially outwardly. When the plunger 42 is moved inwardly to the position shown in FIGURE 5 the control ring 41 is moved counterclockwise as viewed in FIGURE 5 and the shutter leaves are opened to permit the passage of light along the straight-through axis I.

The hemispherical cap 14 will be seen in FIGURES 4 and 5 to be provided with an inner cam surface with sections 14A, 14B, and 14C against which the outer end 42D of the slide member 42 rides. As seen most clearly in FIGURE 5 the surface 14C is midway between the surfaces 14A and 14C and is adapted when engaged with slide 42 to hold slide 42 inwardly. Thus when the shutter apparatus is in the condition shown in FIGURE 5 with the cam surface 14B engaging the end of the plunger 42 the shutter leaves 30–34 are held in their open condition. When the end 42D of the plunger 42 is aligned with either of the low cam surfaces 14A or 14C the spring members 44 and 45 by acting on the control ring 41 will urge the plunger 42 radially outwardly and therefore the shutter leaves 30–34 will be in a closed condition as illustrated in FIGURE 3.

The shutter support member 40 will be seen in FIGURE 4 to have a cylindrical sleeve portion 40D which extends rearwardly in FIGURE 4 and is adapted to pass through and ride on the inner surface of the front opening in the hemispherical cap 14. The cylindrical sleeve-like portion 40D of the shutter support member 40 extends beyond the outer surface of the cap member 14 and is provided with tapped holes for receiving the retaining screws 50 and 51 which pass through the knurled adjustment knob 15 (FIGURE 4) so that the adjustment knob 15 is securely fixed to the shutter support member 40. The hemispherical cap 14 is secured to the spherical housing member 10 by means of three studs 49 and therefore the cam surface provided on the front interior portion of the hemispherical cap 14 remains stationary while the shutter assembly including the knurled knob 15 is supported for rotation with respect to the stationary cam surfaces 14A, 14B and 14C.

From the above it will be seen that a shutter apparatus associated with the line of sight indicated by the numeral I is in opened condition only when the plunger 42 is held radially inwardly and that when the control knob 15 is rotated to either of the other two positions indicated by the markings "II" and "III" on the front of the hemispherical cap 14 (FIGURE 6) the shutter leaves 30–34 will be moved to their closed positions. The control knob 15 is provided with a pointer 15A to facilitate use of the instrument and to permit an operator to determine which of the three openings 11, 12 or 13 is then transmitting light to the alignment telescope 16. A ball-and-spring detent assembly including the ball 54 and spring 55 is provided between the knob 15 and the front of the hemispherical cap 14, the arrangement being such that the ball 54 is urged against the front of the hemispherical cap 14 and is adapted to engaged associated slots in the front of the hemispherical cap 14, one of which 14D will be seen in FIGURE 2, corresponding to the three desired positions for the adjustment knob 15. Thus an operator is able to rapidly select a desired one of the three positions of the knob 15. While a single slot in the base of the hemispherical cap 14 for cooperation with the ball 54 and corresponding to the position of the ring 15 when the pointer 15A is aligned with the number I position (i.e. the plunger 42 in alignment with the cam section 14B) is suitable when the interior of the cap 14 has the surfaces 14A, 14B and 14C as shown, three such slots permit the use of a cam surface on the interior of the cap 14 having a single low portion 14B with the remainder thereof being in the form of a cylindrical surface at a constant radius from the control ring 41 so that the knob 15 can be rotated through 360°.

The passage of light to the alignment scope 16 through the openings 12 and 13 is controlled by a shutter sleeve 60 seen most clearly in FIGURE 3 as being substantially in the form of a thin-walled right circular cylindrical member having a single exit opening hole 60A provided in the wall thereof. As described hereinafter, the hole or opening 60A is selectively positioned in alignment with one or the other of the two openings 12 or 13 in the spherical housing member 10 when one or the other of the lines of sight II or III is being located. When the line of sight indicated as line of sight I is being determined the hole or opening 60A is positioned midway between the openings 12 and 13 in the spherical housing member 10 so that the solid wall of the cylindrical shutter sleeve 60 will prevent the passage of light from the openings 12 and 13 to the optical element 20. A conical shutter sleeve control member 61 (FIGURE 3) is provided with radial lugs 61A which are adapted to fit into the associated openings 60B in the shutter sleeve 60 so that the conical control member 61 and the shutter sleeve 60 are effectively coupled together and hence the position of the shutter sleeve 60 is determined by the position of the conical control member 61. The shutter control member 61 is secured to the previously described shutter support member 40 by means of the threaded studs 62 (FIGURE 3). A spacing ring 64 is positioned between the conical control member 61 and the shutter support member 40 so that the shutter leaves 30–34 previously described will be free to rotate without interference from the conical member 61.

From the above it will be seen that the shutter control member 61 and the shutter sleeve 60 will be positioned by rotation of the control knob 15 and hence the apparatus will operate to maintain a selected one of the lines of sight in a condition for the receipt and transmission of light to the alignment telescope 16. With a single movement of the knob 15 the operator is able to simultaneously close the undesired openings and select the single desired opening. It is of importance to note that the shutter apparatus including the shutter leaves and shutter sleeve is contained within a spherical housing so that there is provided an apparatus which not only achieves substantial improvement in the art in terms of functional operation but also which avoids the hereto encountered problem of protruding lens caps.

The improved optical element 20 disposed within the spherical housing 10 which permits the simultaneous location of three mutually perpendicular axes without movement of the alignment instrument is shown in greater detail in FIGURES 7, 8, 9 and 10. The optical element as shown in FIGURE 7 is rotated 90° about the straight-through line of sight I from its position of FIGURES 1 and 2 as an aid in teaching the construction details thereof. Referring now to FIGURES 7 through 10, it will be seen that the improved optical element 20 is a composite structure which acts as a two-directional pentaprism and includes a polyhedron 80 and a pair of truncated triangular prisms or optical wedges 81 and 82 permanently adhered thereto. While only six major surfaces of the eight-sided polyhedron 80 are actually used, the member 80 is preferably in the shape of an irregular eight-sided polyhedron for ease of construction and to minimize the physical size thereof for fitting within the spherical housing assembly previously described. The six surfaces of the polyhedron which are used for reflecting or transmitting light are designated as the surfaces 80A, 80B, 80C, 80D, 80E, and 80F. With the optical element in the position shown in FIGURE 7, these surfaces can be referred to in general as the bottom, front, right end, top, left end, and rear surfaces, respectively, for convenience of description. Thus it will be seen that a bottom surface 80A is a flat planar surface having five edges and at an angle of 90° with respect to the second or front surface 80B which acts as the light exit surface through which light is transmitted to the alignment telescope 16. As seen most clearly in the front view of FIGURE 9, the right end surface 80C if extended would intersect the plane of the top surface 80D at an angle indicated at 71 and equal to 45°. In a similar manner and as shown in the top view of FIGURE 8, the fifth and sixth surfaces 80E and 80F if extended would intersect each other at an angle 70 which is also equal to 45° The left end and top surfaces 80D and 80E are coated in a conventional manner with silver or aluminum so that each of said surfaces 80E and 80D is substantially 100% reflective to light impinging thereon from the interior of the polyhedron member. The right end and the rear surfaces 80C and 80F are made partially reflective so that light can enter therethrough from the exterior of the member and yet interior light reflected thereon from surfaces 80D and 80E, respectively, will be reflected therefrom in the manner described below. The truncated triangular prism members 81 and 82 are respectively secured to the surfaces 80F and 80C so that light can pass therethrough and through the surfaces 80C and 80F in a substantially undeviated path (or in a path such that the original direction thereof is undeviated).

As seen most clearly in FIGURE 8, light traveling along the line of sight path II will pass through the optical wedge 82 and will enter the member 80 through the right end surface 80C. The arrangement is such that light traveling parallel to the planar surfaces 80A and 80B along the line of sight II will be reflected from the totally reflected surface 80E and directed against the partially reflective surface 80F. Since surfaces 80E and 80F form an angle of 45° the light will be reflected from surface 80E perpendicular to the line of sight II and will exit from the optical element in a direction perpendicular to the exit plane surface 80B.

Light traveling toward the optical element along the straight-through line of sight I passes through the first correction wedge 81, enters the member 80 through the partially silvered or aluminized rear surface 80F, and travels in a straight line through the member 80 to exit therefrom perpendicular to the exit plane surface 80B. In practice the outer surfaces 81A and 82A of the correction wedges 81 and 82 are perpendicular to each other and each is perpendicular to the bottom or first plane 80A.

Light traveling parallel to the third line of sight III (perpendicular to the bottom surface 80A) enters the member 80 through the bottom surface 80A, is reflected by the totally reflective interior surface of the top surface 80D, is directed against the partially coated surface 80C and is reflected therefrom parallel to the bottom plane since surfaces 80D and 80C are at 45° with respect to each other. Thus when the light is reflected from the interior of surface 80C it is parallel to the second line of sight II and will be reflected from the interior of surfaces 80E and 80F to exit from the optical element perpendicular to the exit plane 80B.

The various surfaces are so cut and the wedges 81 and 82 are appropriately adhered to the eight-sided polyhedron member 80 so that three mutually perpendicular axes indicated by the numerals I, II, and III intersect at a common point in the interior of the member 80. The point of intersection of the three mutually perpendicular axes is then positioned at the center of the sphere defined by the spherical housing member 10. The distance between the center of the spherical housing member 10 and the spherical support member 18 is accurately measured and is known for each instrument and therefore the exact point of reference for the three mutually perpendicular axes is accurately located in space.

While not essential to the construction of a suitable piece of equipment, it is advantageous to utilize a 66% aluminum coating on the surface 80F and only a 50% coating on the surface 80C, that is, a ratio of about 1.32 to 1. By following this technique the intensity of the light received by the eye of the user will be substantially the same regardless of which of the three mutually perpendicular axes the viewer is then looking along since the differences in the amount of coating on the surfaces 80F and 80C will compensate for the differing number of reflections undergone by light entering the optical element along the different axes. The light entrance areas of the surfaces for light from along the axis I and II is also preferably the same, which also, due to the reflection from surface 80C of light entering the bottom plane 80A, serves to effectively equalize the light entrance area of the bottom plane.

From the above it will be seen that an improved optical element is provided which has the desirable characteristic of receiving light from three mutually perpendicular axes and directing the same therefrom along a single axis with three mutually perpendicular axes intersecting at the interior of the optical element. The optical element is securely positioned within the spherical housing 10 by means of the optical element holding member 90 seen most clearly in FIGURE 2. The member 90 has circular openings aligned with the openings 11 and 13 in the housing member 10. The optical element 20 is preferably secured to the holding element 90 by means of a suitable adhesive. The spherical housing member 10 is provided with a surface 10C which receives the holding element 90, the arrangement being such that during assembly the mating surfaces of the holding element 90 and the surface 10C are lapped to obtain an accurate fit such that the surface 80B of the optical element is perpendicular to the straight-through line of sight defined by the optical axis of the alignment telescope 16. Four adjustment set screws which are of the conventional locking type extend through the spherical housing member 10 and engage the base of the optical element holding member 90 to not only firmly wedge the holding element 90 against the mating surface of the spherical housing member 10 but also permit accurate adjustment of the optical element in the plane perpendicular to the telescope optical axis. The intersection of the three mutually perpendicular axes I, II, and III can thus be exactly centered at the center of the spherical housing. A rigid structure is thus provided and accurate alignment is attained. After the optical element has been accurately positioned the holding member 90 is preferably glued in place by means of a suitable adhesive.

There has thus been described an improved optical alignment instrument particularly useful in establishing accurate reference axes and which makes it possible for an operator to locate three mutually perpendicular axes without the need for movement of the optical alignment instrument. The novel shutter assemblies make it possible for the operator to readily select one of the lines of sight and to block the other two. As is common in the art, suitable optical targets are used with the alignment instrument and serve as the light sources or targets on which the alignment telescope 16 is focused in a manner known per se in the art. While the improved optical element has been described by reference to a preferred embodiment thereof making use of a pair of optical correction wedges, it should be mentioned that the manufacturing tolerances of the optical element can be relaxed if various wedges are utilized in combination with the polyhedron member. In one element constructed in accordance with the present invention the interior angles between the planes of surfaces 80B and 80E, and between 80A and 80C, were each made equal to 112½° to maximize the light transmission paths through the element. While the invention has been described by reference to preferred embodiments thereof, those changes and modifications which will become obvious to a person skilled in the art as a result of the teachings hereof are intended to be encompassed by the following claims.

What is claimed is:

1. An optical alignment instrument comprising in combination: an optical device for receiving without a change in its position a light beam traversing any of first, second and third separate, mutually intersecting light paths, each pair of which defines a plane different from that defined by each of the other pairs thereof, and further operable without a change in its position to direct a light beam from any of said paths along a single common light path, said device including
   (1) first optical means positioned to receive light passing along the first light path and operable to direct said light along said common light path,
   (2) second optical means positioned to receive light passing along the second light path and operable to direct said second-path light to the first optical means, said first optical means being further positioned to direct along said common light path, the second path light received from said second optical means, and
   (3) third optical means positioned to receive light passing along the third light path and operable to direct said third-path light to said second optical means, said first and second optical means being further positioned to direct along said common light path the third-path light received from said third optical means; and
light control means positioned in the respective first, second and third separate light paths for obstructing passage of light along each of them selectively.

2. An optical alignment instrument as defined in claim 1 wherein said separate light paths are mutually orthogonal.

3. An optical alignment instrument as defined in claim 1 further including a housing supporting and enclosing said optical device and light control means, and wherein said light control means comprises first, second and third shutter means operable selectively to admit light into said housing along one of the respective first, second and third separate light paths while blocking admittance of light along the other two of said separate light paths.

4. An optical alignment instrument as defined in claim 3, wherein said shutter means includes a light control member having an opening therein selectively positionable in alignment with one or the other of said first or second separate light paths and a leaf shutter assembly positioned in said third light path.

5. An optical alignment instrument as defined in claim 4 wherein said light control member is a thin walled right circular member having a single opening in the wall thereof, means supporting said light control member for rotation with respect to said housing means, and wherein said light control means further includes an adjustment member and means connecting said adjustment member with said right circular member and with said leaf shutter assembly for simultaneous operation of said right circular member and said leaf shutter assembly in response to operation of said adjustment member.

6. An optical alignment instrument as defined in claim 1 wherein said third optical means includes two optical surfaces positioned respectively in said second and third separate light paths.

7. An optical alignment instrument as defined in claim 6 wherein said separate light paths are mutually orthogonal and wherein said optical device comprises a single optical prism element.

8. An optical alignment instrument comprising in combination: housing means having first, second and third light entrance openings for receiving and passing to the interior thereof light from first, second and third intersecting mutually perpendicular directions and a single light exit opening for the transmission of light from the housing means; light receiving and directing means disposed in fixed position in said housing means for receiving without a change in its position light from any of said first, second and third openings and for directing said light through said light exit opening along a common light path extending in a direction perpendicular to said first and second directions; light control means supported by said housing means and operable to obstruct selectively the transmission of light through the respective first, second and third openings.

9. An optical alignment instrument as defined in claim 8 wherein said light control means comprises shutter means positioned in the respective first, second and third openings and selectively operable to block or permit transmissions of light through said openings, and a single control member coupled with said shutter means for simultaneously adjusting said shutter means to transmit light only through selected ones of said first, second and third openings.

10. An optical alignment instrument as defined in claim 9 wherein said shutter means includes a thin walled member supported for rotation with respect to said housing means and having a single shutter opening selectively positionable in alignment with one or the other of said first and second openings.

11. An optical alignment instrument as defined in claim 9 wherein said shutter means includes a leaf shutter assembly aligned with one of said first or second openings and a thin walled member selectively positionable in alignment with the other of said first or second openings to block the transmission of light therethrough, and including coupling means coupling said control member with said leaf shutter assembly and with said thin walled member.

12. An optical alignment instrument as defined in claim 11 wherein: said leaf shutter assembly is aligned with said second opening to control the receipt of light by said optical means from said second direction; and said thin walled member is a right circular cylindrical member having a light control opening therein and supported for rotation within said housing means to a first position wherein said light control opening is aligned with said first opening, a second position wherein said light control opening is aligned with said third opening, and a third position wherein said light control opening is not aligned with either said first or said third opening.

13. An optical alignment instrument as defined in claim 12 wherein: said leaf shutter assembly includes a shutter leaf support member, a plurality of shutter leaves pivotally supported on said support member, a shutter leaf control ring supported for rotation on said support member and including a plurality of pins coupling said ring with each of said shutter leaves, said ring having a first position holding said shutter leaves open and a second position holding said shutter leaves closed; said coupling means includes means coupling said control member with said control ring and with said right circular cylindrical member; and said control member has a first position maintaining said ring in its said first position and said cylindrical member in its said third position, a second postion maintaining said ring in its said second position and said cylindrical member in its said first position, and a third position maintaining said ring in its said second position and said cylindrical member in its said second position.

14. An optical alignment instrument as defined in claim 13 wherein: said control member is rigidly secured to said shutter leaf support member, said shutter leaf support member and said control member are supported for rotation with respect to said housing means, and including a shutter ring actuating slide coupled with said ring, and cam means cooperating with said slide for operation thereof in response to rotation of said control member.

15. An optical alignment instrument as defined in claim 14 wherein said coupling means includes a conical coupling member secured to said shutter leaf support member and having lugs engaged with said cylindrical member.

16. An optical alignment instrument comprising in combination:
(1) a light beam combining device operable without a change in its position to receive light traversing any of three separate light paths which intersect at a common point and each pair of which defines a plane different from that defined by each of the other pairs and to direct said light along a common light path, said device including first, second and third light direction means,
  (a) said first light directing means being positioned with respect to the first light path to direct light traversing the same to said common light path and being further positioned with respect to the second and third light directing means to receive light therefrom and direct such light along said common light path, and
  (b) said second and third light directing means each including optical elements respectively positioned in said second and third light paths and being further positioned with respect to said first and second light directing means to direct light traversing the respective second and third light paths to said first beam directing means whereby said light is further directed to said common light path; and
(2) light control means positioned in the respective separate light paths for selectively obstructing passage of light therein.

17. An optical instrument as defined in claim 16 wherein said separate light paths are mutually orthogonal.

References Cited

UNITED STATES PATENTS

| | | | |
|---|---|---|---|
| 1,012,715 | 12/1911 | Saegmuller. | |
| 1,616,279 | 2/1927 | Parodi | 350—33 X |
| 1,971,061 | 8/1934 | Bauersfeld | 350—35 X |
| 2,505,819 | 5/1950 | Wrigley | 350—33 X |
| 2,909,097 | 10/1959 | Alden et al. | 350—33 X |
| 3,107,168 | 10/1963 | Hogan et al. | |
| 3,229,562 | 1/1966 | Reisinger. | |

RONALD L. WIBERT, Primary Examiner.

T. MAJOR, Assistant Examiner.

U.S. Cl. X.R.

33—46